June 3, 1958     H. GÜNTHER     2,837,157
BILLET SHEARS AND THE LIKE
Filed Aug. 11, 1954
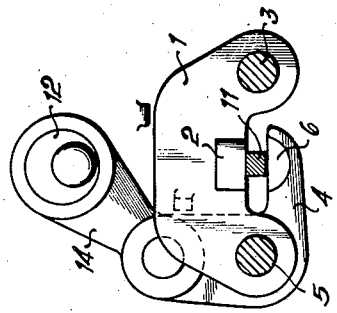
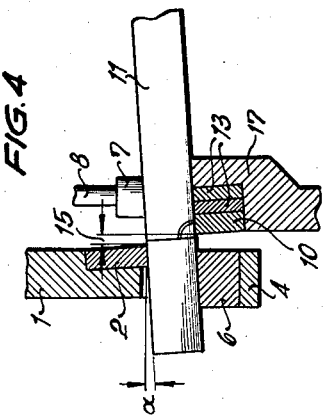
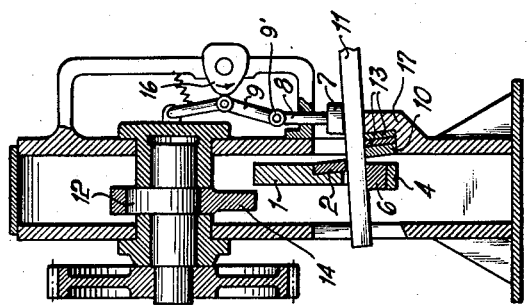
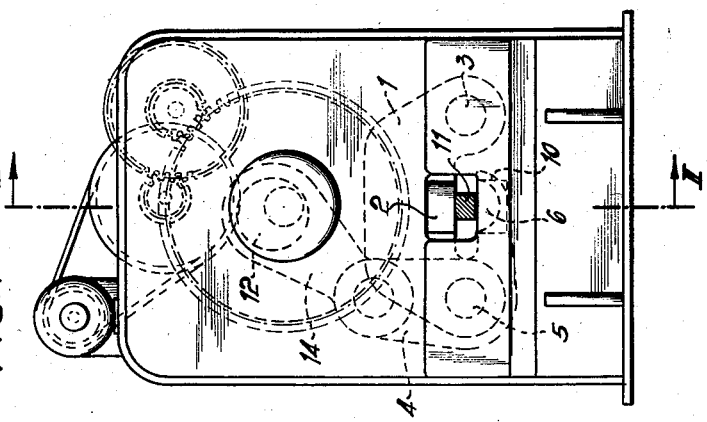
INVENTOR
Helmut GÜNTHER

United States Patent Office 2,837,157
Patented June 3, 1958

2,837,157
BILLET SHEARS AND THE LIKE

Helmut Günther, Karlsruhe, Germany, assignor to Industrie-Werke Karlsruhe Aktiengesellschaft, Karlsruhe, Germany Application August 11, 1954, Serial No. 449,209

Claims priority, application Germany August 13, 1953

6 Claims. (Cl. 164—45)

The present invention relates to shears and, more specifically, concerns billet or sheet bar shears having a controlled holding or supporting device for the workpiece for obtaining a clean rectangular cut.

Shears with a holding or supporting device for cutting billets are known, which are actuated by compressed air, hydraulically or mechanically. Such shears, however, require an additional shifting mechanism.

Furthermore shears with a holding or supporting device for cutting billets are known which are provided with actuating springs. These shears, however, require a relatively high amount of energy.

It is, therefore, an object of the present invention to provide shears with a holding or supporting device for obtaining a clean rectangular cut, which will overcome the above mentioned drawbacks.

It is another object of this invention to provide shears of the type set forth in the preceding paragraph which will make it possible to derive the holding or supporting pressure from the shearing force.

These and other objects and advantages of the invention will appear more clearly from the following specification in connection with the accompanying drawing in which:

Fig. 1 is a diagrammatic front view of a billet shears according to the invention.

Fig. 2 represents a section along the line II—II of Fig. 1.

Fig. 3 illustrates the lever arrangement of the billet shears of Fig. 1.

Fig. 4 shows the position of the knives during the cutting operation.

General arrangement

According to the present invention, the upper shearing knife is carried by a shiftable cutting or shearing lever pivotally supported by a bolt and arranged to slide by the lower knife which is connected to the frame, the workpiece to be sheared off being by the corresponding shearing pressure clamped fast between the holding or supporting lever or beam and the cutting lever. The holding or supporting beam or lever pivotally connected to a cutting lever is moved by a pressure rod rotatably mounted on the cutting lever. This is preferably done by means of an eccentric or also hydraulically. The play between the upper and lower knife is adjustable at random for instance by key means. The workpiece is fed to the cutting knives not at a right angle but under an acute angle of small magnitude.

Structural arrangement

Referring now to the drawing, the shears illustrated therein comprise a cutting beam or shearing lever 1 having connected thereto a cutting knife 2 forming an upper cutting member. The cutting beam 1 is pivotally supported by a bolt or shaft 3. The cutting beam 1 carries a bolt 5 pivotally supporting the holding or supporting lever or beam 4. Rotatably mounted on the holding or supporting beam 4 is a press rod 14 which latter is movable by means of an eccentric 12.

In order to prevent bending of the work piece 11 to be cut prior to the actual cutting process, the holding beam 4 supports a pressure member 6, whereas a pressure member 7 is mounted on a pressure rod 8. The pressure rod 8 is pivotally connected at 9' to a bell crank lever 9 which latter is adapted to be actuated by means of an eccentric 16.

The cutting knife or upper cutting member 2 is arranged for cooperation with a cutting knife 10 which forms a lower cutting member and is mounted on a stationary support 17. The lower cutting knife 10 also cooperates with the pressure member 7 for holding the work piece portion to be cut off.

It will now be clear from the above and with specific reference to the arrangement shown in Fig. 3 of the drawing that when the eccentric 12 is actuated, the beam 4 will tilt about the pivot 5 linking the cutting beam 1 and supporting beam 4 together so that the beam 4 will tilt in counterclockwise direction about the pivot 5 with regard to Fig. 3, while at the same time the beam 1 will tilt in counterclockwise direction about the pivot 3 so that the work piece section 11 to be cut off is firmly clamped between the cutting knife 2 and the pressure member 6. After this clamping pressure has been established, the beams 4 and 1 are tilted together so to speak as a rigid unit further about the pivot or shaft 3, and as a result thereof, the knife 2 in cooperation with knife 10 severs the section between knife 2 and the pressure member 6 from the rest of the work piece or stock material.

In order to obtain cuts free from cracks, it is necessary that the knife play 15 between the upper and the lower knife may be adjusted in conformity with the dimensions of the work piece. To this end, in conformity with Fig. 4, the lower knife 10 is laterally displaceable by means of shims 13. By an appropriate selection of the knife play, a clean break or cut is obtained. As a result of the knife play 15, the break or cut will not extend at a right angle with regard to the axis of the workpiece if the workpiece were fed in a horizontal plane, i. e. at a right angle to the plane in which the upper cutter knife moves. For this reason the workpiece is not fed at a right angle but at an acute angle $a$ to the plane of movement of the cutter beam 1.

It is, of course, understood that the present invention is, by no means, limited to the particular construction described above in connection with the drawing, but also comprises any modifications within the scope of the appended claims.

What I claim is:

1. In combination in a shears for cutting billets, sheet bars and the like: a frame, a shaft stationarily supported by said frame, an upper shearing knife, a shearing lever supporting said upper knife and pivotally supported by said shaft for tilting movement in a vertical plane, the cutting plane of said upper shearing knife being slightly inclined with regard to said vertical plane, a stationary support, a lower shearing knife with the cutting plane thereof substantially parallel to the cutting plane of said upper knife, said lower knife being stationarily supported by said support in offset spaced opposite arrangement with regard to said upper knife for receiving therebetween that portion of a workpiece which is to be cut off from said workpiece, said shearing lever being movable to pass said upper knife closely by said lower knife to perform a cutting operation, a two-arm holding lever arranged laterally of and in spaced arrangement to said lower shearing knife for holding that portion of the work piece which is to be cut off against said upper knife during a cutting operation, pivot means pivotally connecting said holding lever with said shearing lever, a movable clamping member arranged opposite said support and movable to clamp a workpiece from which a piece is to be cut off against said stationary support, and actuating means for actuating said two-arm lever, said shearing lever and said clamping lever.

2. An arrangement according to claim 1, in which said lower shearing knife is adjustable to vary the play thereof relative to said upper shearing knife.

3. In combination in a shears for cutting billets, sheet bars and the like; a frame, a shaft stationarily supported by said frame, an upper shearing knife, a shearing lever supporting said upper knife and pivotally supported by said shaft for tilting movement in a vertical plane, the cutting plane of said upper shearing knife being slightly inclined with regard to said vertical plane, a stationary support, a lower shearing knife with the cutting plane thereof substantially parallel to the cutting plane of said upper knife, said lower knife being stationarily supported by said support in offset spaced opposite arrangement with regard to said upper knife for receiving therebetween that portion of a workpiece which is to be cut off from said workpiece, said shearing lever being movable to pass said upper knife closely by said lower knife to perform a cutting operation, a two-arm holding lever arranged laterally of and in spaced arrangement to said lower shearing knife for holding that portion of the workpiece which is to be cut off against said upper knife during a cutting operation, pivot means pivotally connecting said holding lever with said shearing lever, a movable clamping member arranged opposite said support and movable to clamp a workpiece from which a piece is to be cut off against said stationary support, first driving means for actuating said two-arm lever, first eccentric means operatively interconnecting said driving means and said two-arm lever for conveying actuating power from said eccentric means to said two-arm lever, second eccentric means, and a lever system operatively connected to said clamping member and operable by said second eccentric means for actuating said clamping member.

4. In combination in a shears for cutting billets, sheet bars and the like: a frame, an upper shearing knife, a shearing lever supporting said upper knife, shaft means stationarily supported by said frame and pivotally supporting said shearing lever, a lower shearing knife arranged for cooperation with said upper shearing knife, a stationary support stationarily supporting said lower knife, said knives being so arranged with regard to each other as to allow the introduction of a workpiece to be cut between said knives and to allow said upper knife to slide by said lower knife, a two-arm supporting lever arranged laterally of said lower shearing knife, said supporting lever being pivotally connected to and supported by said shearing lever and having its one arm arranged for holding that portion of the workpiece against said shearing knife which is to be cut off from the workpiece, actuating means operatively connected to the other arm of said two-arm supporting lever for actuating the same, clamping means movable toward said stationary support for clamping a workpiece to be cut against the said stationary support, and actuating means operable for actuating said clamping means.

5. In combination in a shears for cutting billets, sheet bars and the like: a frame, an upper shearing knife, a shearing lever supporting said upper knife, one end of said shearing lever being pivotally connected to said frame, a lower shearing knife arranged for cooperation with said upper shearing knife, a stationary support stationarily supporting said lower shearing knife, said knives being arranged with regard to each other so as to allow the introduction of a workpiece to be cut between said knives and to allow said upper knife to slide by said lower knife for performing a cutting operation therewith, a movable clamping member movable to clamp a workpiece from which a portion is to be cut off against said stationary support, first pressure conveying means operable to convey actuating pressure upon said clamping member, a two-arm holding lever arranged laterally of said lower shearing knife and having one of its arms arranged for holding that portion of the workpiece which is to be cut off against said upper knife during a cutting operation, said two-arm lever being pivotally connected with the other end of said shearing lever, second pressure conveying means linked to the other arm of said two-arm lever for conveying holding pressure to said two-arm lever whereby said two-arm lever presses the workpiece portion to be cut off against said upper knife, and actuating means for respectively actuating said first and said second pressure conveying means.

6. An arrangement according to claim 5, in which said actuating means comprises a first eccentric for engaging said first pressure conveying means and a second eccentric for engaging said second pressure conveying means.

References Cited in the file of this patent
UNITED STATES PATENTS

| | | |
|---|---|---|
| 2,254,316 | Rider | Sept. 2, 1941 |
| 2,370,311 | Hercik | Feb. 27, 1945 |
| 2,662,597 | Ballard et al. | Dec. 15, 1953 |